United States Patent
Melnikova et al.

(10) Patent No.: US 9,944,832 B2
(45) Date of Patent: Apr. 17, 2018

(54) PRESSURE SENSITIVE ADHESIVE

(71) Applicant: tesa SE, Norderstedt (DE)

(72) Inventors: Aliona Melnikova, Hamburg (DE);
Sven Hansen, Hamburg (DE);
Bernhard Müssig, Seevetal (DE);
Sebastian Schmidt-Lehr, Seevetal (DE)

(73) Assignee: TESA SE, Norderstedt (DE)

( * ) Notice: Subject to any disclaimer, the term of this patent is extended or adjusted under 35 U.S.C. 154(b) by 219 days.

(21) Appl. No.: 15/147,378

(22) Filed: May 5, 2016

(65) Prior Publication Data

US 2016/0333233 A1 Nov. 17, 2016

(30) Foreign Application Priority Data

May 12, 2015 (DE) .................. 10 2015 208 792

(51) Int. Cl.
| | | |
|---|---|---|
| *C09J 133/08* | (2006.01) | |
| *C08F 220/18* | (2006.01) | |
| *C09J 7/00* | (2018.01) | |
| *C09J 133/02* | (2006.01) | |
| *C08K 7/16* | (2006.01) | |
| *C08K 7/20* | (2006.01) | |
| *C08K 7/24* | (2006.01) | |

(52) U.S. Cl.
CPC ........... *C09J 133/08* (2013.01); *C08F 220/18* (2013.01); *C09J 7/00* (2013.01); *C09J 133/02* (2013.01); *C08K 7/16* (2013.01); *C08K 7/20* (2013.01); *C08K 7/24* (2013.01); *C08K 2201/003* (2013.01); *C09J 2201/36* (2013.01); *C09J 2201/606* (2013.01); *C09J 2201/622* (2013.01); *C09J 2205/102* (2013.01); *C09J 2205/11* (2013.01); *C09J 2433/00* (2013.01)

(58) Field of Classification Search
CPC .......... C09J 7/00; C09J 133/02; C09J 133/08; C08K 7/16; C08K 7/18; C08K 7/20; C08K 7/22; C08K 7/24; C08K 7/26; C08K 7/28
USPC .................................................. 523/218, 219
See application file for complete search history.

(56) References Cited

U.S. PATENT DOCUMENTS

| | | | |
|---|---|---|---|
| 4,855,170 A | * | 8/1989 | Darvell et al. |
| 2007/0104943 A1 | | 5/2007 | D'Souza |
| 2011/0281964 A1 | | 11/2011 | Zmarsly et al. |
| 2012/0029105 A1 | | 2/2012 | Czerwonatis et al. |

FOREIGN PATENT DOCUMENTS

| | | |
|---|---|---|
| CA | 1124428 | 5/1982 |
| DE | 2821606 A1 | 11/1978 |
| DE | 102009015233 A1 | 10/2010 |
| DE | 102009054955 A1 | 3/2011 |
| DE | 102010062669 A1 | 6/2012 |
| EP | 0818521 A2 | 1/1998 |
| EP | 1995282 A1 | 11/2008 |
| WO | 2010147888 A2 | 12/2010 |

OTHER PUBLICATIONS

DE Search Report for corresponding application DE 10 2015 208 792.1 dated Dec. 14, 2015.

* cited by examiner

*Primary Examiner* — Edward J Cain
(74) *Attorney, Agent, or Firm* — Norris McLaughlin & Marcus PA

(57) ABSTRACT

The intention is to provide powerful pressure sensitive adhesives with high adhesion and adjustable cohesive failure characteristics. This is accomplished with pressure sensitive adhesives which comprise
 30-90 wt % of at least one poly(meth)acrylate;
 10-60 wt % of three-dimensional bodies K made from an inorganic material with a maximum extent of 40 to 300 μm; and
 0.1-10 wt % of at least partly expanded microballoons M, based in each case on the total weight of the pressure sensitive adhesive. Another subject of the invention is an adhesive tape which comprises a pressure sensitive adhesive of this kind.

19 Claims, No Drawings

PRESSURE SENSITIVE ADHESIVE

This application claims foreign priority benefit under 35 U.S.C. § 119 of German Patent Application No. 10 2015 208 792.1, filed May 12, 2015, the disclosure of which German patent application, in its entirety, is incorporated herein by reference.

The invention pertains to the technical field of pressure sensitive adhesives of the kind used in adhesive tapes for the temporary or permanent joining of substrates, such as of component parts, for example. Proposed more particularly are pressure sensitive adhesives which combine high adhesion with strong cohesion and adjustable cohesive failure characteristics.

For the performance requirements profile of pressure-sensitive adhesive systems and the pressure-sensitive adhesive articles produced with such systems, the two physical parameters of adhesion and cohesion are of fundamental importance. Adhesion is addressed in the technical terminology with the terms "instantaneous bond strength" (tack) and "bond strength" (peel adhesion), and is the physical variable behind terms such as "self-adhesive" and "pressure-sensitive adhesive", which describe the achievement of a more or less "permanent adhesive bond under gentle applied pressure". Cohesion is responsible for the internal strength of a pressure-sensitive adhesive. It endows the system with resistance to shearing stress, which occurs, for example, when the products in question are employed at relatively high temperatures and/or under relatively high mechanical loads.

The performance capabilities of pressure sensitive adhesives are therefore substantially determined by the relationship between their adhesion and cohesion properties. These properties are in turn determined by the nature, compatibility, homogeneity and stability of the adhesive ingredients.

In order to obtain particular properties, such as high bond strengths, in a pressure sensitive adhesive, it is known prior-art practice to employ relatively high molecular mass, highly crosslinked polymer building blocks and/or systems comprising fillers. For instance, EP 0 818 521 A2 describes a three-layer adhesive tape which has a carrier layer based on crosslinked rubbers. Reinforcing fillers, moreover, may have been added to the rubber in the carrier.

A pressure-sensitive layer of adhesive with good resistance toward peeling and shearing forces is presented in DE 28 21 606 A1. The layer of adhesive has a thickness of more than 200 μm, comprising hollow glass microbeads dispersed throughout the layer.

EP 1 995 282 A1 is directed to a viscoelastic layer comprising microparticles of which 90% have a diameter of 30 μm or less. The viscoelastic layer may be used as a pressure sensitive adhesive layer or as an adhesive tape substrate.

US 2007/0104943 A1 describes resin or polymer compositions with a filling of hollow microstructures, the D50 diameter of the hollow microstructures being 25 μm or less. The compositions are said to exhibit above-average impact strength and elongation.

For a multiplicity of applications of pressure-sensitive adhesive systems, foamed systems have proved to be increasingly important. Foams are capable, for example, of exerting a buffering effect by absorbing kinetic energy; they are also able to compensate unevennesses in the adhesive-bond interfaces, since in many cases they have a ready capacity for deformation. In order to render foams utilizable for pressure sensitive adhesive articles, both foamed carrier materials and foamed pressure sensitive adhesives can be employed.

DE 10 2009 015 233 A1 describes a method for producing a foamed adhesive system that comprises thermally sensitive substances. The adhesive system in a first step is foamed at a first temperature, and in a subsequent step the thermally sensitive substances are added at a lower temperature to the adhesive system. Also described is the use of adhesive systems obtained in this way as self-adhesive material for adhesive tapes.

A foaming method using expandable hollow microbeads, their expansion within the mixing apparatus being largely suppressed, is described in DE 10 2010 062 669 A1. The materials described in that specification as well are intended for use as carriers and/or as a permanently tacky surface layer of an adhesive tape.

WO 2010/147888 A2 describes a foam which comprises a polymer, a multiplicity of at least partly expanded expandable polymer microbeads, and 0.3 to 1.5 wt % of a silicon dioxide having a surface area of at least 300 $m^2/g$.

There is an ongoing need for adhesive tapes having specific properties tailored to particular applications. Of interest for example for outdoor applications in the construction sector are adhesive bonds which offer resistance to wind loads, in other words to loading peaks that are active over short durations, and also resistance to removal under their own weight, and additionally to those which are able to compensate well for thermal stresses. It is important here that the performance capability of such adhesive bonds can be reliably calculated and predicted. This can be achieved much more effectively with adhesive tapes having predictable cohesive failure than with those which also or even predominantly exhibit adhesive failure.

It is an object of the invention accordingly to provide base compositions for foamed single-layer or multi-layer adhesive tapes that endow these systems with high adhesion, particularly with adhesion which is always higher than cohesion, and, accordingly, with adjustable, predictable failure characteristics in the form of what is called cohesive fracture—that is, fracture within the adhesive layer and not in the interfaces thereof with the substrate. In spite of these mandated failure characteristics, the compositions are of course to permit stable, high-performance adhesive bonds.

The achievement of the object is based, as a central concept of the invention, on a combination of at least partly expanded microballoons with inorganic fillers.

A first general subject of the invention is a pressure sensitive adhesive which comprises
  30-90 wt % of at least one poly(meth)acrylate;
  10-60 wt % of three-dimensional bodies K made from an inorganic material with a maximum extent of 40 to 300 μm; and
  0.1-10 wt % of at least partly expanded microballoons M, based in each case on the total weight of the pressure sensitive adhesive.

A pressure sensitive adhesive or pressure-sensitive adhesive is understood in accordance with the invention, as customary within the general usage, as a material which at least at room temperature is permanently tacky and also adhesive. Characteristics of a pressure sensitive adhesive are that it can be applied by pressure to a substrate and remains adhering there, with no further definition of the pressure to be applied or the period of exposure to this pressure. Generally speaking, although in principle dependent on the precise nature of the pressure sensitive adhesive, the temperature, the atmospheric humidity, and the substrate, a minimal pressure of short duration, which does not go beyond gentle contact for a brief moment, is enough to achieve the adhesion effect, while in other cases a longer-term period of exposure to a higher pressure may be necessary.

Pressure sensitive adhesives have particular, characteristic viscoelastic properties which result in the permanent tack and adhesiveness. A characteristic of these adhesives is that when they are mechanically deformed, there are processes of viscous flow and there is also development of elastic forces of resilience. The two processes have a certain relationship to one another in terms of their respective proportion, in dependence on not only the precise composition, the structure and the degree of crosslinking of the pressure sensitive adhesive but also on the rate and duration of the deformation, and on the temperature.

The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness) and hence often also to a high peel strength. Highly crosslinked systems, crystalline polymers or polymers with glasslike solidification lack flowable components and are therefore in general devoid of tack or possess only little tack at least.

The proportional elastic forces of resilience are necessary for the attainment of cohesion. They are brought about, for example, by very long-chain macromolecules with a high degree of coiling, and also by physically or chemically crosslinked macromolecules, and they permit the transmission of the forces that act on an adhesive bond. As a result of these forces of resilience, an adhesive bond is able to withstand a long-term load acting on it, in the form of a long-term shearing load, for example, sufficiently over a relatively long time period.

For the more precise description and quantification of the extent of elastic and viscous components, and also of the ratio of the components to one another, the variables of storage modulus (G') and loss modulus (G") are employed, and can be determined by means of Dynamic Mechanical Analysis (DMA). G' is a measure of the elastic component, G" a measure of the viscous component of a substance. Both variables are dependent on the deformation frequency and the temperature.

The variables can be determined with the aid of a rheometer. In that case, for example, the material under investigation is exposed in a plate/plate arrangement to a sinusoidally oscillating shearing stress. In the case of instruments operating with shear stress control, the deformation is measured as a function of time, and the time offset of this deformation relative to the introduction of the shearing stress is measured. This time offset is referred to as phase angle δ.

The storage modulus G' is defined as follows: $G'=(\tau/\gamma)\cdot\cos(\delta)$ ($\tau$=shear stress, $\gamma$=deformation, $\delta$=phase angle=phase shift between shear stress vector and deformation vector). The definition of the loss modulus G" is as follows: $G''=(\tau/\gamma)\cdot\sin(\delta)$ ($\tau$=shear stress, $\gamma$=deformation, $\delta$=phase angle=phase shift between shear stress vector and deformation vector).

A composition is considered in general to be a pressure sensitive adhesive, and is defined in the sense of the invention as such, if at 23° C. in the deformation frequency range from $10^0$ to $10^1$ rad/sec both G' and G" are located at least partly in the range from $10^3$ to $10^7$ Pa. "Partly" means that at least one section of the G' curve lies within the window described by the deformation frequency range from $10^0$ inclusive up to $10^1$ inclusive rad/sec (abscissa) and by the G' value range from $10^3$ inclusive up to $10^7$ inclusive Pa (ordinate), and if at least one section of the G" curve is likewise located within the same window.

The pressure sensitive adhesive of the invention is preferably in the form of a sheetlike structure. By this is meant a three-dimensional structure whose extent in two directions in space is much greater than its extent in the third direction in space. Interpreted more particularly as a sheetlike structure is a layer of a pressure sensitive adhesive of the kind customarily found in a pressure sensitive adhesive tape. With particular preference the pressure sensitive adhesive of the invention takes the form of a sheetlike structure, and the thickness (the smallest extent of the sheetlike structure in one of the three directions in space) is 400 to 5000 μm, more preferably 500 to 2000 μm. The thickness of the sheetlike structure is measured in accordance with the invention with a commercial thickness meter provided with a thickness gauge. For this purpose the sheetlike structure consisting of the pressure sensitive adhesive of the invention is lined with a release foil to prevent the gauge penetrating too far into the adhesive. For the lined adhesives, the thickness gauge used is a spherical cap, for example. It is also necessary to determine the thickness of the liner foil, allowing the thickness of the sheetlike structure to be determined by subtraction. To measure the thickness of the liner foil, a ruby sphere is used, for example, as thickness gauge. Measurement takes place in each case at an interval of at least 100 m along the longitudinal extent of the sheetlike structure or of the liner foil, respectively, at not less than 10 measurement points transverse to the web. The thickness is reported as an average of the results obtained.

A "poly(meth)acrylate" is a polymer whose monomer basis consists to an extent of at least 70 wt % of acrylic acid, methacrylic acid, acrylic esters and/or methacrylic esters, with acrylic esters and/or methacrylic esters being present at not less than 50 wt %, based in each case on the overall monomer composition of the polymer in question. Poly(meth)acrylates are obtainable generally by radical polymerization of acrylic and/or methylacrylic monomers and also, optionally, other copolymerizable monomers. In accordance with the invention the term "poly(meth)acrylate" encompasses not only polymers based on acrylic acid and derivatives thereof but also those based on acrylic acid and methacrylic acid and derivatives thereof, and those based on methacrylic acid and derivatives thereof.

The poly(meth)acrylate of the pressure sensitive adhesive of the invention may preferably be traced back to the following monomer composition:

a) acrylic esters and/or methacrylic esters of the formula (I)

$$CH_2=C(R^I)(COOR^{II}) \qquad (I),$$

in which $R^I$ is H or $CH_3$ and $R^{II}$ is an alkyl radical having 4 to 14 C atoms, more preferably having 4 to 9 C atoms;

b) olefinically unsaturated monomers having functional groups which exhibit reactivity with crosslinker substances;

c) optionally further olefinically unsaturated monomers which are copolymerizable with the monomers (a) and (b).

The proportions of the monomers a), b), and c) are selected with particular preference such that the poly(meth)acrylate has a glass transition temperature of ≤15° C. (DMA at low frequencies). For this purpose it is advantageous to select the monomers a) with a proportion of 45 to 99 wt %, the monomers b) with a proportion of 1 to 15 wt %, and the monomers c) with a proportion of 0 to 40 wt %, based in each case on the overall monomer composition of the poly(meth)acrylate.

The monomers a) are more preferably plasticizing and/or apolar monomers. Preferably, therefore, the monomers a) are selected from the group encompassing n-butyl acrylate, n-butyl methacrylate, n-pentyl acrylate, n-pentyl methacrylate n-amyl acrylate, n-hexyl acrylate, n-hexyl methacrylate, n-heptyl acrylate, n-octyl acrylate, n-octyl methacrylate, n-nonyl acrylate, isobutyl acrylate, isooctyl acrylate, isooctyl methacrylate, 2-ethylhexyl acrylate and 2-ethylhexyl methacrylate.

The monomers b) are preferably olefinically unsaturated monomers having functional groups which are able to enter into a reaction with epoxide groups. More preferably the monomers b) each contain at least one functional group selected from the group consisting of hydroxyl, carboxyl, sulphonic acid and phosphonic acid groups, acid anhydride functions, epoxide groups, and substituted or unsubstituted amino groups.

In particular the monomers b) are selected from the group consisting of acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, maleic anhydride, 2-hydroxyethyl acrylate, 3-hydroxypropyl acrylate, 2-hydroxyethyl methacrylate, 3-hydroxypropyl methacrylate, 6-hydroxyhexyl methacrylate, allyl alcohol, glycidyl acrylate and glycidyl methacrylate.

Contemplated as monomers c) in principle are all vinylically functionalized compounds which are copolymerizable with the monomers a) and with the monomers b). Through selection and amount of the monomers c) it is possible advantageously to regulate properties of the pressure sensitive adhesive of the invention.

The monomers c) are more preferably selected from the group consisting of methyl acrylate, ethyl acrylate, n-propyl acrylate, methyl methacrylate, ethyl methacrylate, benzyl acrylate, benzyl methacrylate, sec-butyl acrylate, tert-butyl acrylate, phenyl acrylate, phenyl methacrylate, isobornyl acrylate, isobornyl methacrylate, tert-butylphenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, methyl 3-methoxyacrylate, 3-methoxybutyl acrylate, phenoxyethyl acrylate, phenoxyethyl methacrylate, 2-phenoxyethyl methacrylate, butyl diglycol methacrylate, ethylene glycol acrylate, ethylene glycol monomethyl acrylate, methoxypolyethylene glycol methacrylate 350, methoxypolyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoro-propyl methacrylate, 2,2,3,3,4,4-hexafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-pentadecafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, N,N-dialkyl-substituted amides, more particularly N,N-dimethylacrylamide, N,N-dimethylmethacrylamide, N-benzylacrylamide, N-isopropylacrylamide, N-tert-butylacrylamide, N-tert-octylacrylamide, N-methylolacrylamide, N-methylolmethacrylamide; additionally acrylonitrile, methacrylonitrile; vinyl ethers such as vinyl methyl ether, ethyl vinyl ether, vinyl isobutyl ether; vinyl esters such as vinyl acetate; vinyl chloride, vinyl halides, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene, 2-polystyrene-ethyl methacrylate (molecular weight Mw of 4000 to 13 000 g/mol) and poly(methyl methacrylate)-ethyl methacrylate (Mw of 2000 to 8000 g/mol).

The monomers c) may advantageously also be selected such that they contain functional groups which support radiation-chemical crosslinking (by electron beams or UV, for example). Suitable copolymerizable photoinitiators are, for example, benzoin acrylate and acrylate-functionalized benzophenone derivatives. Monomers which support crosslinking by electron bombardment are, for example, tetrahydrofurfuryl acrylate, N-tert-butylacrylamide and allyl acrylate.

With particular preference, where the pressure sensitive adhesive of the invention comprises a plurality of poly(meth)acrylates, all poly(meth)acrylates in the pressure sensitive adhesive of the invention can be traced back to the above-described monomer composition. More particularly all poly(meth)acrylates in the pressure sensitive adhesive of the invention can be traced back to a monomer composition consisting of acrylic acid, n-butyl acrylate and methyl acrylate.

In particular, the poly(meth)acrylate and/or all poly(meth)acrylates in the pressure sensitive adhesive of the invention can be traced back to the following monomer composition:
Acrylic acid 3-15 wt %
Methyl acrylate 10-35 wt %
2-Ethylhexyl acrylate 50-87 wt %,
the proportions of the monomers adding up to 100 wt %.

The poly(meth)acrylates can be prepared by radical polymerization of the monomers in solvents, more particularly in solvents having a boiling range of 50 to 150° C., preferably of 60 to 120° C., using the customary amounts of polymerization initiators, which are in general 0.01 to 5, more particularly 0.1 to 2 wt % (based on the total weight of the monomers).

Suitable in principle are all customary initiators familiar to the skilled person. Examples of radical sources are peroxides, hydroperoxides and azo compounds, as for example dibenzoyl peroxide, cumene hydroperoxide, cyclohexanone peroxide, di-tert-butyl peroxide, cyclohexylsulphonyl acetyl peroxide, diisopropyl percarbonate, tert-butyl peroctoate, benzopinacol. One very preferred procedure uses 2,2'-azobis(2-methylbutyronitrile) or 2,2'-azobis(2-methylpropionitrile) (2,2'-azobisisobutyronitrile; AIBN) as radical initiator.

Solvents contemplated for preparing the poly(meth)acrylates include alcohols such as methanol, ethanol, n-propanol and isopropanol, n-butanol and isobutanol, preferably isopropanol and/or isobutanol, and also hydrocarbons such as toluene and, in particular, benzines from a boiling range of 60 to 120° C. Additionally it is possible to use ketones such as preferably acetone, methyl ethyl ketone, methyl isobutyl ketone, and esters such as ethyl acetate, and also mixtures of solvents of the type stated, preference being given to mixtures which include isopropanol, more particularly in amounts of 2 to 15 wt %, preferably 3 to 10 wt %, based on the solvent mixture used.

With preference in accordance with the invention, after the preparation (polymerization) of the poly(meth)acrylates, there is a concentration procedure, and the further processing of the poly(meth)acrylates is substantially solvent-free. The polymer can be concentrated in the absence of crosslinker and accelerator substances. It is also possible, however, for one of these classes of substance to be added to the polymer even prior to concentration, in which case the concentration takes place in the presence of this or these substance(s).

After the concentration step, the polymers can be transferred to a compounder. Concentration and compounding may optionally also take place in the same reactor.

The weight-average molecular weights Mw of the poly(meth)acrylates in the pressure sensitive adhesive of the invention are situated preferably in a range from 20 000 to 2 000 000 g/mol; very preferably in a range from 100 000 to 1 500 000 g/mol, most preferably in a range from 150 000 to 1 000 000 g/mol. The figures for average molecular weight Mw and for polydispersity PD in this specification relate to the determination by gel permeation chromatography. It may be advantageous to carry out the polymerization in the presence of suitable chain transfer agents such as thiols, halogen compounds and/or alcohols in order to set the desired average molecular weight.

The poly(meth)acrylate preferably has a K value of 30 to 90, more preferably of 40 to 70, as measured in toluene (1% strength solution, 21° C.). The K value of Fikentscher is a measure of the molecular weight and the viscosity of the polymer.

Likewise suitable in accordance with the invention are poly(meth)acrylates which have a narrow molecular weight distribution (polydispersity PD<4). In spite of a relatively low molecular weight, these compositions have particularly good shear strength after crosslinking. Moreover, the lower polydispersity makes processing from the melt easier, since the flow viscosity is lower than that of a more broadly distributed poly(meth)acrylate, for largely the same service properties. Narrowly distributed poly(meth)acrylates may be prepared advantageously by anionic polymerization or by controlled radical polymerization methods, the latter being especially suitable. Via N-oxyls as well it is possible to prepare corresponding poly(meth)acrylates. Besides these methods, Atom Transfer Radical Polymerization (ATRP) can be employed advantageously for the synthesis of narrowly distributed polyacrylates, in which case the initiator used preferably comprises monofunctional or difunctional, secondary or tertiary halides, with the halides being abstracted using Cu, Ni, Fe, Pd, Pt, Ru, Os, Rh, Co, Ir, Ag or Au complexes.

The poly(meth)acrylate(s) in the pressure sensitive adhesive of the invention is/are preferably crosslinked. While thick layers of composition are hard to crosslink homogeneously via conventional electron beam or UV radiation treatment, owing to the rapidly decreasing radiation intensity with increasing depth of penetration, thermal crosslinking provides sufficient remedy for this situation. Preferably, therefore, the pressure sensitive adhesive of the invention is crosslinked thermally. Layers of compositions considered to be thick are more particularly those with a thickness of more than 150 μm.

The poly(meth)acrylates in the pressure sensitive adhesive of the invention are crosslinked preferably with isocyanates, more particularly with trimerized isocyanates and/or blocking-agent-free and sterically hindered isocyanates, and/or with epoxide compounds, in each case in the presence of functional groups in the polymer macromolecules that are able to react with isocyanate groups and/or epoxide groups, respectively.

In order to attenuate the reactivity of the isocyanates, it is possible advantageously to use isocyanates blocked with thermally eliminable functional groups. Blocking takes place preferably using aliphatic primary and secondary alcohols, phenol derivatives, aliphatic primary and secondary amines, lactams, lactones and malonic esters.

Where epoxy-amine systems are used as crosslinker systems, the amines can be converted into their salts in order to ensure an increase in the pot life. In this case readily volatile organic acids (e.g. formic acid, acetic acid) or readily volatile mineral acids (e.g. hydrochloric acid, derivatives of carbonic acid) are preferred for salt formation.

A fundamental problem when using thermal crosslinkers in the preparation of the pressure sensitive adhesive of the invention arises from the increase in temperature that is needed for the expansion of the microballoons. The choice of the relatively slow-to-react crosslinkers identified above, particularly preferably together with accelerator systems for regulating the kinetics of the crosslinking reaction, is particularly advantageous, since with these crosslinkers it is possible to employ the temperatures needed for foaming, without the composition system suffering damage.

Having been found particularly preferable for the pressure sensitive adhesive of the invention is a crosslinker-accelerator system which comprises at least one crosslinker substance containing epoxide groups and at least one accelerator substance with an effect of accelerating the linking reaction at a temperature below the melting temperature of the poly(meth)acrylate. The system presupposes the presence in the polymers of functional groups which are able to enter into crosslinking reactions with epoxide groups. Suitable substances containing epoxide groups include polyfunctional epoxides, especially difunctional or trifunctional epoxides (i.e. those having two or three epoxide groups, respectively), or else epoxides of higher functionality, or mixtures of epoxides with different functionalities. Accelerators used are preferably amines (to be interpreted formally as substitution products of ammonia), examples being primary and/or secondary amines, especially tertiary and/or polyfunctional amines. Also possible for use are substances which have two or more amine groups, these amine groups being primary and/or secondary and/or tertiary amine groups, more particularly diamines, triamines and/or tetramines. Selected more particularly are those amines which enter into no reactions or only minor reactions with the polymer building blocks. Further examples of accelerators which can be used are phosphorus-based accelerators, such as phosphines and/or phosphonium compounds.

Particularly suitable functional groups in the poly(meth)acrylate for crosslinking include acid groups (for example carboxylic, sulphonic and/or phosphonic acid groups) and/or hydroxyl groups and/or acid anhydride groups and/or epoxide groups and/or amine groups. It is particularly advantageous if the polymer comprises copolymerized acrylic acid and/or methacrylic acid.

It may, however, also be advantageous not to include accelerators, since they may have a tendency, for example, towards yellowing (especially nitrogen-containing substances). Examples of suitable crosslinkers which work without addition of accelerator include epoxycyclohexyl derivatives, especially when carboxylic acid groups are present in the poly(meth)acrylate for crosslinking. This may be realized for example by at least 5 wt % copolymerized acrylic acid into the polymer. In the polymer for crosslinking there are advantageously, in particular, no proton acceptors, no electron-pair donors (Lewis bases) and/or no electron-pair acceptors (Lewis acids) present. The absence of these substances relates here in particular to externally added accelerators, in other words not copolymerized accelerators and/or accelerators incorporated into the polymer framework; with particular preference, however, there are neither externally added nor copolymerized accelerators present, and especially no accelerators at all. Crosslinkers which have emerged as being particularly advantageous are epoxycyclohexylcarboxylates such as (3,4-epoxycyclohexane) methyl 3,4-epoxycyclohexylcarboxylate.

Besides the poly(meth)acrylate(s), the pressure sensitive adhesive of the invention may also comprise one or more further polymers. These include, for example, acrylate-insoluble polymers such as polyolefins (e.g. LDPE, HDPE, polypropylene), polyolefin copolymers (e.g. ethylene-propylene copolymers), polyesters, copolyesters, polyamides, copolyamides, fluorinated polymers, polyalkylene oxides, polyvinyl alcohol, ionomers (for example, ethylene-methacrylic acid copolymers neutralized with base), cellulose acetate, polyacrylonitrile, polyvinyl chloride, thermoplastic polyurethanes, polycarbonates, ABS copolymers and polydimethylsiloxanes. Further suitable polymers are polybutadiene, polyisoprene, polychloroprene and copolymers of styrene and dienes. Additionally suitable are polymers which are inherently pressure-sensitively adhesive or which can be rendered pressure-sensitively adhesive through the addition of bond strength enhancers, examples of such polymers being poly-α-olefins such as polyoctene, polyhexene and atactic polypropylene; specific block copolymers (diblock, triblock, star-shaped block copolymers and combinations thereof), natural and synthetic rubbers, silicones and ethylene-vinyl acetate.

In one specific embodiment the pressure sensitive adhesive of the invention comprises 15 to 50 wt % of at least one synthetic rubber. Synthetic rubber is included preferably at 20 to 40 wt %, based in each case on the total weight of the pressure sensitive adhesive.

Preferably in this embodiment at least one synthetic rubber in the pressure sensitive adhesive of the invention is a block copolymer having an A-B, A-B-A, $(A-B)_n$, $(A-B)_nX$ or $(A-B-A)_nX$ construction,
in which
the blocks A independently of one another are a polymer formed by polymerization of at least one vinylaromatic;
the blocks B independently of one another are a polymer formed by polymerization of conjugated dienes having 4 to 18 C atoms and/or isobutylene, or are a partly or fully hydrogenated derivative of such a polymer;
X is the residue of a coupling reagent or initiator; and
n is an integer ≥2.

In particular in this embodiment all synthetic rubbers in the pressure sensitive adhesive of the invention are block copolymers having a construction as set out above. The pressure sensitive adhesive of the invention may therefore also comprise mixtures of different block copolymers having a construction as above.

Suitable block copolymers (vinylaromatic block copolymers) thus comprise preferably one or more rubberlike blocks B (soft blocks) and one or more glasslike blocks A (hard blocks). More preferably at least one synthetic rubber in the pressure sensitive adhesive of the invention is a block copolymer having an A-B, A-B-A, $(A-B)_3X$ or $(A-B)_4X$ construction, where A, B and X are as defined above. Very preferably all synthetic rubbers in the pressure sensitive adhesive of the invention are block copolymers having an A-B, A-B-A, $(A-B)_3X$ or $(A-B)_4X$ construction, where A, B and X are as defined above. More particularly the synthetic rubber in the pressure sensitive adhesive of the invention is a mixture of block copolymers having an A-B, A-B-A, $(A-B)_3X$ or $(A-B)_4X$ construction which preferably comprises at least diblock copolymers A-B and/or triblock copolymers A-B-A.

Block A is generally a glasslike block having a preferred glass transition temperature (Tg, DSC) which is above room temperature. More preferably the Tg of the glasslike block is at least 40° C., more particularly at least 60° C., very preferably at least 80° C. and most preferably at least 100° C. The proportion of vinylaromatic blocks A in the overall block copolymers is preferably 10 to 40 wt %, more preferably 20 to 33 wt %. Vinylaromatics for the construction of block A include preferably styrene, α-methylstyrene and/or other styrene derivatives. Block A may therefore be a homopolymer or copolymer. More preferably block A is a polystyrene.

The vinylaromatic block copolymer additionally generally has a rubberlike block B or soft block having a preferred Tg of less than room temperature. The Tg of the soft block is more preferably less than 0° C., more particularly less than −10° C., as for example less than −40° C., and very preferably less than −60° C.

Preferred conjugated dienes as monomers for the soft block B are, in particular, selected from the group consisting of butadiene, isoprene, ethylbutadiene, phenylbutadiene, piperylene, pentadiene, hexadiene, ethylhexadiene, dimethylbutadiene and the farnesene isomers, and also any desired mixtures of these monomers. Block B as well may be a homopolymer or copolymer.

The conjugated dienes as monomers for the soft block B are more preferably selected from butadiene and isoprene. For example, the soft block B is a polyisoprene, a polybutadiene or a partly or fully hydrogenated derivative of one of these two polymers, such as polybutylenebutadiene in particular; or a polymer of a mixture of butadiene and isoprene. Very preferably the block B is a polybutadiene.

The pressure sensitive adhesive of the invention comprises three-dimensional bodies K made from an inorganic material. In the sense of the invention, a three-dimensional body refers to a three-dimensional limited geometric form which can be described by interfaces. A geometric form is called three-dimensional when it is not fully present in any one plane, and limited when there is a sphere which completely contains this form.

The best-known bodies possess flat or circular or spherical interfaces. Examples are cylinders, cones, spheres, prisms, pyramids, tetrahedra, cubes, and the five regular polyhedrons. When a body is bounded exclusively by planar faces, it is referred to as a polytope or as a restricted polyhedron (multi-faceted body).

The bodies used in accordance with the invention may accordingly have, among others, the following forms:
Parallelepiped, with cuboid and hexahedron (cube) as special instances Prisms, with the cylinder as a generalization and with cuboid and hexahedron as special instances Pyramids, with the cone as a generalization and tetrahedron as a special instance Antiprisms, with octahedron as a special instance Hemispheres Shell sections.

Preferred in accordance with the invention are ellipsoids, more preferably rotational ellipsoids and very preferably spheres, as the three-dimensional bodies K.

The bodies K, including more particularly those recited above, as for example a cube, preferably have no corners or sharp edges. For this purpose, the corners or edges actually present may be, or may have been, rounded off.

The "maximum extent" of a body K refers to the largest-possible length, for the body in question, of a straight line which joins two points lying in the surface of the body K. Where a body K has the form of a sphere, the maximum extent corresponds to its diameter. The maximum extent of the three-dimensional bodies K is preferably 45 µm to 150 µm, more preferably 50 µm to 100 µm, for example 52 µm to 85 µm and very preferably 55 µm to 70 µm.

The inorganic material of the three-dimensional bodies K is preferably selected from the group consisting of glass, ceramic and flyash, more particularly from the group consisting of ceramic and flyash. The bodies K may be either solid bodies or hollow bodies. Where they are hollow bodies, the expression "body made from an inorganic material" describes the body as comprising hollow bodies whose wall consists of an inorganic material. The inorganic material is therefore the material of the solid component of the bodies K.

In one specific embodiment the inorganic material of the three-dimensional bodies K is glass.

In another specific embodiment the inorganic material of the three-dimensional bodies K is ceramic.

In another specific embodiment the inorganic material of the three-dimensional bodies K is flyash.

With particular preference the three-dimensional bodies K are solid glass beads, hollow ceramic beads and/or hollow flyash beads, more particularly hollow ceramic beads or hollow flyash beads.

The pressure sensitive adhesive of the invention preferably comprises 30 to 50 wt % of three-dimensional bodies K having a maximum extent of 45 µm to 150 µm. More preferably the pressure sensitive adhesive of the invention comprises 30 to 50 wt % of three-dimensional bodies K having a maximum extent of 45 µm to 80 µm. More particularly the pressure sensitive adhesive of the invention comprises 30 to 50 wt % of solid glass beads, hollow ceramic beads and/or hollow flyash beads having a diameter of 45 µm to 80 µm. Very preferably the pressure sensitive adhesive of the invention comprises from 30 to 50 wt % of hollow ceramic beads and/or hollow flyash beads having a diameter of 45 µm to 80 µm.

By "microballoons" are meant hollow microbeads which are elastic, and therefore in their basic state are expandable, which have a thermoplastic polymer shell. These beads are filled with low-boiling liquids or liquefied gas. Shell material used includes, in particular, polyacrylonitrile, PVDC, PVC or polyacrylates. Customary low-boiling liquids are, in particular, hydrocarbons of the lower alkanes, for example isobutane or isopentane, which are enclosed under pressure as liquefied gas in the polymer shell.

As a result of exposure of the microballoons, more particularly exposure to heat, the outer polymer shell softens. At the same time, the liquid propellant gas present within the shell undergoes transition to its gaseous state. At this point, the microballoons undergo an irreversible and three-dimensional expansion. Expansion is at an end when the internal pressure matches the external pressure. Since the polymeric shell is retained, a closed-cell foam is obtained accordingly.

A multiplicity of types of microballoons are available commercially, and differ essentially in their size (6 to 45 µm in diameter in the unexpanded state) and in the initiation temperatures they require for expansion (75 to 220° C.). Unexpanded microballoon products are also available as an aqueous dispersion with a solids fraction or microballoon fraction of around 40 to 45 wt %, and also, moreover, as polymer-bonded microballoons (masterbatches), as for example in ethylene-vinyl acetate with a microballoon concentration of around 65 wt %. The microballoon dispersions, the masterbatches, and the unexpanded microballoons as such are suitable for producing pressure sensitive adhesives of the invention.

In one embodiment of the invention the microballoons are used in unexpanded state together with one or more plasticizers, for example with phthalates, water-soluble plasticizers, polyesters, plasticizer resins, cyclohexanedicarboxylic diesters, phosphates or polyphosphates. The pressure sensitive adhesive of the invention therefore preferably comprises at least one plasticizer. The weight ratio of microballoons to plasticizer is preferably 3:2 to 2:3, more preferably 1.2:1 to 0.8:1, more particularly 1.1:1 to 0.9:1. Plasticizers lower the strength of the pressure sensitive adhesive and therefore promote cohesive splitting and therefore predictable failure characteristics and also the tack, the "touch stickiness" of the composition. A predictable, calculable failure behaviour on the part of adhesive bonds is of interest, for example, in construction applications (bonding of architectural facings) and in automotive engineering (bonding of bumpers).

Preferred plasticizers are low-viscosity polyesters having a dynamic viscosity at 20° C. of ≤2500 mPas, measured to DIN EN ISO 3219 (for example Palemon® 652 from BASF, CAS No. 208945-13-5). Plasticizers of this kind have the further advantage that they are comparatively compatible with the poly(meth)acrylate(s) and do not soften the shells of the microballoons.

Pressure sensitive adhesives of the invention can also be produced with what are called preexpanded microballoons. In the case of this group, the expansion takes place prior to the incorporation of the microballoons into the polymer matrix. In accordance with the invention, the pressure sensitive adhesive comprises at least partly expanded microballoons, independently of the mode of production and of the initial form in which the microballoons are used. With preference in accordance with the invention at least 90% of all cavities in the pressure sensitive adhesive that are formed by the microballoons have a maximum extent of 10 to 500 µm, more preferably of 15 to 200 µm.

The term "at least partly expanded microballoons" is understood in accordance with the invention such that the microballoons have undergone at least expansion to an extent such as to bring about a reduction in the density of the adhesive to a technically meaningful extent in comparison to the same adhesive with the unexpanded microballoons. This means that the microballoons need not necessarily have undergone full expansion. The "at least partly expanded microballoons" have preferably expanded in each case to at least twice their maximum extent in the unexpanded state.

The expression "at least partly expanded" relates to the expanded state of the individual microballoons and is not intended to mean that only part of the microballoons in question must have undergone (initial) expansion. If, therefore, there are "0.1 to 10 wt % of at least partly expanded microballoons" present in the adhesive, this means that all of these "0.1 to 10 wt % of at least partly expanded microballoons" have undergone at least partial expansion in the above sense, and unexpanded microballoons do not belong to the "0.1 to 10 wt % of at least partly expanded microballoons".

The weight ratio of the three-dimensional bodies K to the at least partly expanded microballoons M in the adhesive of the invention is preferably from 6:1 to 30:1.

The pressure sensitive adhesive of the invention may comprise additives in order to bring about certain properties or to make them more pronounced.

In one embodiment the pressure sensitive adhesive of the invention comprises at least one resin. This is preferably a tackifier resin. Resins for the purposes of the invention are oligomeric and polymeric compounds having a number-average molecular weight $M_n$ of not more than 5000 g/mol. The maximum resin fraction is limited by the miscibility with the polymers of higher molecular mass, optionally themselves blended with further substances; at any rate there ought to be a homogeneous mixture formed between resin and polymers.

The tackifying resins (tackifier resins) are preferably selected from the group consisting of pinene resins, indene resins and rosins and their disproportionated, hydrogenated, polymerized and/or esterified derivatives and salts, aliphatic and aromatic hydrocarbon resins, terpene resins and terpene-phenolic resins, and also C5, C9 and other hydrocarbon resins, in each case individually or in combination with one another. Preferred terpene-phenolic resins are, for example, Dertophene T105 and Dertophene T110; a preferred hydrogenated rosin derivative is Foral 85.

The pressure sensitive adhesive of the invention may comprise ageing inhibitors. In the embodiment described above, in which it comprises at least one synthetic rubber, the pressure sensitive adhesive of the invention preferably comprises at least one ageing inhibitor.

The pressure sensitive adhesive of the invention may further comprise flame retardants. Preferred flame retardants are high molecular mass phosphate esters, an example being Reofos® RDP (CAS No. 57583-54-7). The flame retardants are preferably added as a blend with the microballoons to the pressure sensitive adhesive as it is being formed.

A further subject of the invention is an adhesive tape which comprises a pressure sensitive adhesive of the invention.

In one embodiment a layer of the pressure sensitive adhesive of the invention forms the adhesive tape of the invention, which is therefore an adhesive transfer tape. In this embodiment the pressure sensitive adhesive of the invention preferably comprises at least one resin which is selected from the group consisting of pinene resins, indene resins and rosins and their disproportionated, hydrogenated, polymerized and/or esterified derivatives and salts, aliphatic and aromatic hydrocarbon resins, terpene resins and terpene-phenolic resins and also C5, C9 and other hydrocarbon resins, each individually or in combination with one another. More preferably in this embodiment the pressure sensitive adhesive of the invention comprises a terpene-phenolic resin, more particularly 20 to 40 wt %, as for example 25 to 35 wt %, of at least one terpene-phenolic resin, based in each case on the total weight of the pressure sensitive adhesive.

In another embodiment of the adhesive tape of the invention it comprises on at least one side of the pressure sensitive adhesive of the invention a further pressure sensitive adhesive HM1. The adhesive tape of the invention preferably comprises a pressure sensitive adhesive of the invention, and that adhesive comprises on its top and bottom face in each case a further pressure sensitive adhesive HM1 and HM2, respectively. More preferably HM1 and HM2 are pressure sensitive adhesives which comprise to an extent of at least 50 wt %, more particularly at least 70 wt %, as for example at least 90 wt %, based in each case on the total weight of the pressure sensitive adhesive in question, of one or more poly(meth)acrylates which can be traced back to the following monomer composition:

80 to 95 wt % 2-ethylhexyl acrylate and/or n-butyl acrylate,
5 to 20 wt % acrylic acid.

The poly(meth)acrylates of HM1 and HM2 may in each case be crosslinked, preferably in the manner described above for the pressure sensitive adhesive of the invention, more particularly by thermal crosslinking via at least one or more epoxycyclohexyl derivatives in the absence of accelerators, more particularly of proton acceptors, electron-pair donors (Lewis bases) and/or electron-pair acceptors (Lewis acids).

The terms top and bottom side for the purposes of this specification serve merely for a local differentiation of the two surfaces of the pressure sensitive adhesive of the invention, and are not intended otherwise to contain any further directional information. On the "top side", therefore, means in particular on one of the sides of the layer in question; on the bottom side means on the other side of the layer in question.

EXPERIMENTAL SECTION

Measurement Methods

Solids Content (Measurement Method A1):

The solids content is a measure of the proportion of non-vaporizable constituents in a polymer solution. It is determined gravimetrically, with the solution being weighed, then the vaporizable fractions being evaporated in a drying oven at 120° C. for 2 hours, and the residue being weighed again.

K Value (According to Fikentscher) (Measurement Method A2):

The K value is a measure of the average size of molecules of high-polymer compounds. For the measurement, one percent strength (1 g/100 ml) toluenic polymer solutions are prepared and their kinematic viscosities are determined with the aid of a VOGEL-OSSAG viscometer. Following standardization to the viscosity of the toluene, the relative viscosity is obtained, and the K value can be calculated from this by the method of Fikentscher (Polymer 8/1967, 381 ff.).

Gel Permeation Chromatography GPC (Measurement Method A3):

The figures for the weight-average molecular weight $M_w$ and the polydispersity PD in this specification relate to the determination by gel permeation chromatography. The determination is made on a 100 µl sample which has undergone clarifying filtration (sample concentration 4 g/l). The eluent used is tetrahydrofuran with 0.1 vol % of trifluoroacetic acid. Measurement takes place at 25° C. The pre-column used is a PSS-SDV column, 5µ, $10^3$ Å, ID 8.0 mm·50 mm. Separation takes place using the columns of type PSS-SDV, 5β, $10^3$ Å and also $10^5$ Å and $10^6$ Å in each case with ID 8.0 mm×300 mm (columns from Polymer Standards Service; detection by Shodex RI71 differential refractometer). The flow rate is 1.0 ml per minute. Calibration takes place against PMMA standards (polymethyl methacrylate calibration).

Specific Weight/Density (Measurement Method A4);

Density Determination Via Coatweight and Layer Thickness:

The specific weight or the density ρ of a coated self-adhesive composition is determined via the ratio of the basis weight to the particular layer thickness:

$$\rho = \frac{m}{V} = \frac{MA}{d}$$

$$[\rho] = \frac{[kg]}{[m^2] \cdot [m]} = \left[\frac{kg}{m^3}\right]$$

MA=coatweight/basis weight (without liner weight) in [kg/m²]

d=layer thickness (without liner thickness) in [m].

This method gives the gross density.

This density determination is suitable in particular for determining the total density of completed products, including multi-layer products.

90° Peel Adhesion on Steel—Open and Lined Side (Measurement Method V1):

The peel adhesion to steel is determined under test conditions of 23° C.+/−1° C. temperature and 50%+/−5% relative humidity. The specimens were cut to a width of 20 mm and adhered to a steel plate. The steel plate is cleaned and conditioned before measurement. For this purpose the plate is first wiped with acetone and then left to stand in the air for 5 minutes to allow the solvent to evaporate.

The side of the three-layer assembly facing away from the test substrate was then lined with a 50 μm aluminium foil, to prevent the specimen expanding during the measurement. The test specimen was then rolled onto the steel substrate. This was done by rolling over the tape 5 times back and forth with a 2 kg roller at a rolling speed of 10 m/min. Immediately after roller treatment, the steel plate was inserted into a special mount which allows the specimen to be peeled off vertically upward at an angle of 90°. The peel adhesion measurement was carried out using a Zwick tensile testing machine.

The results of measurement are reported in N/cm as averages from three measurements.

Holding Power (Measurement Method V2):

Preparation of specimens took place under test conditions of 23° C.+/−1° C. temperature and 50%+/−5% relative humidity. The test specimen was cut to 13 mm and adhered to a steel plate. The bond area is 20 mm×13 mm (length× width). Prior to the measurement, the steel plate was cleaned and conditioned. For this purpose, the plate is first wiped with acetone and then left to stand in the air for 5 minutes to allow the solvent to evaporate. After bonding had taken place, the open side was reinforced with a 50 μm aluminium foil and rolled over twice back and forth with a 2 kg roller. A belt loop was subsequently mounted on the protruding end of the three-layer assembly. The entire assembly was then suspended from a suitable apparatus and subjected to a load of 10 N. The suspension apparatus causes the weight to load the sample at an angle of 179°+/−1°. This ensured that the three-layer assembly is unable to peel from the lower edge of the plate. The holding power, measured as the time between the sample being suspended and its falling off, is reported in minutes and corresponds to the average value from three measurements. For the measurement of the lined side, the open side is first of all reinforced with the 50 μm aluminium foil, the release material is removed, and bonding takes place to the test plate as described. The measurement is carried out under standard conditions (23° C., 55% humidity).

Detachment Force Under Unilateral Edge Loading—Dynamic L-Test (Measurement Method V3):

A test plate (steel, 50×300×3 mm) was cleaned with ethanol and stored for 24 hours at 23° C. and 50% relative humidity. An L-shaped steel sheet angle was stored in acetone for 30 minutes and then wiped down a number of times on the side where bonding was to take place, using an acetone-soaked cloth. The steel sheet angle was stored in the air for 10 minutes for evaporation of the acetone.

After trimming to 25×25 mm, the adhesive tape was bonded on the bottom side of the smaller leg of the L-shaped steel sheet angle. With the other side of the adhesive tape, the steel sheet angle was then bonded on the test plate. The bonded substrates were pressed against one another for 5 seconds at 60 N using a press with a steel ram. The test specimen was subsequently stored under standard conditions for 24 h.

An additional plate with hook was clamped into the upper clamping jaw of a tensile testing machine. The test plate with the steel sheet angle bonded to it was introduced into a rail. The longer leg of the L-shaped steel sheet angle was joined to the hook, without tension. The steel sheet angle was then peeled from the test plate at a rate of 300 mm/min and at an angle of 90° to the bond face. The maximum force measured during this procedure was ascertained, as was the fracture mode.

Dynamic Shear Strength (Measurement Method V4)

The adhesive tape under investigation was cut to a square with an edge length of 25 mm, bonded overlappingly between two steel plates, and subjected for 1 minute to a pressure of 0.9 kN (force P). After storage for 24 h at 23° C. and 50% relative humidity, the assembly was parted in a Zwick tensile testing machine at 50 mm/min and at 23° C. and 50% relative humidity in such a way that the two steel plates were pulled apart at an angle of 180°. The maximum force was ascertained in N/cm².

Assembly Strength—Dynamic T-Block Test (Measurement Method V5)

Two T-shaped aluminium bodies (T-blocks, 25×25×25 mm), each provided with a hole, were stored in acetone for 30 minutes, wiped off with an acetone-soaked cloth and dried in the air for 10 minutes. The adhesive tape under investigation, cut to 25×25 mm, was applied to the base surface of one of the T-blocks, and, following removal of the release liner, the second T-block was bonded on the free side. The bond was pressed at 110 N for 15 seconds. The test specimen assembly was stored for 24 hours at 23° C. and 50% relative humidity.

The T-blocks bonded to one another were subsequently clamped by means of hooks into a tensile testing machine. The test specimen was pulled apart perpendicularly to the bond face at 300 mm/min. Determinations were made of the maximum force, as the average from five measurements, in N/cm², and also of the fracture mode.

Commercially Available Chemicals Used (See Table Below)

| Chemical compound | Tradename | Manufacturer | CAS No. |
|---|---|---|---|
| Bis(4-tert-butylcyclohexyl) peroxydicarbonate | Perkadox 16 | Akzo Nobel | 15520-11-3 |
| 2,2'-Azobis(2-methylpropionitrile), AIBN | Vazo 64 | DuPont | 78-67-1 |
| Pentaerythritol tetraglycidyl ether | Polypox R16 | UPPC AG | 3126-63-4 |
| 3,4-Epoxycyclohexylmethyl 3,4-epoxycyclohexanecarboxylate | Uvacure 1500 | Cytec Industries Inc. | 2386-87-0 |
| N,N-Dimethyl-N'-3-dimethylaminopropyl-1,3-propanediamine | Jeffcat Z130 | Huntsman | |
| Microballoons (MB1) (dry-unexpanded microspheres, diameter 9-15 µm, expansion start temperature 106-111° C., TMA density ≤25 kg/m³) | Expancel 051 DU 40 | Expancel Nobel Industries | |
| Microballoons (MB2) (dry-unexpanded microspheres, diameter 10-16 µm, expansion start temperature 80-95° C., TMA density ≤12 kg/m³) | Expancel 031 DUX 40 | Expancel Nobel Industries | |
| Hollow ceramic beads (K1) (diameter about 65 µm, maximum density 0.85 g/cm³) | E-Spheres SL 150 | Omega Minerals Germany | |
| Hollow flyash beads (K2) (diameter about 60 µm, maximum density 0.70 g/cm³) | Fillite 160 | Omya Fillite | |
| Solid glass beads (K3) (diameter about 60 µm, maximum density 2.50 g/cm³) | SiLibead Type S 5211-7 | Sigmund Lindner | |
| Solid glass beads (K4) (diameter about 10 µm, maximum density 2.50 g/cm³) | Speriglass EMB-20 | Potters Industries LLC | |
| Terpene-phenolic resin (softening point 110° C.; $M_w$ = 500-800 g/mol; D = 1.50) | Dertophene T110 | DRT resins | 25359-84-6 |
| Adipic acid-based polyester | Palamoll 652 | BASF | |
| n-Butyl acrylate | n-Butyl acrylate | Rohm & Haas | 141-32-2 |
| Acrylic acid | Acrylic acid, pure | BASF | 79-10-7 |
| 2-Ethylhexyl acrylate | 2-Ethylhexyl acrylate | Brenntag | 103-11-7 |
| Methyl acrylate | | BASF | 96-33-3 |

Preparation of Base Polymer Ac 1:

A reactor conventional for radical polymerizations was charged with 72.0 kg of 2-ethylhexyl acrylate, 20.0 kg of methyl acrylate, 8.0 kg of acrylic acid and 66.6 kg of acetone/isopropanol (94:6). After nitrogen gas had been passed through the reactor for 45 minutes with stirring, the reactor was heated to 58° C. and 50 g of AIBN in solution in 500 g of acetone were added. The external heating bath was then heated to 75° C. and the reaction was carried out constantly at this external temperature. After 1 hour a further 50 g of AIBN in solution in 500 g of acetone were added, and after 4 hours the batch was diluted with 10 kg of acetone/isopropanol mixture (94:6).

After 5 hours and again after 7 hours, 150 g portions of bis(4-tert-butylcyclohexyl) peroxydicarbonate, in each case in solution in 500 g of acetone, were added for re-initiation. After a reaction time of 22 hours, the polymerization was discontinued and the batch was cooled to room temperature. The product had a solids content of 55.8% and was dried. The resulting polyacrylate had a K value of 58.9, an average molecular weight of Mw=748 000 g/mol, a polydispersity of D (Mw/Mn)=8.9 and a static glass transition temperature of Tg=−35.2° C.

Pressure-Sensitive Polyacrylate Adhesive Ac-PSA:

A 200 L glass reactor conventional for radical polymerizations was charged with 9.6 kg of acrylic acid, 20.0 kg of butyl acrylate, 50.4 kg of 2-ethylhexyl acrylate and 53.4 kg of acetone/benzine 60/95 (1:1). After nitrogen gas had been passed through the reactor for 45 minutes with stirring, the reactor was heated to 58° C. and 60 g of AIBN were added. The external heating bath was then heated to 75° C. and the reaction was carried out constantly at this external temperature. After a reaction time of 1 hour a further 60 g of AIBN were added. After 4 hours and 8 hours, portions of 20.0 kg of acetone/benzine 60/95 (1:1) mixture were added for dilution. To reduce the residual initiators, 180 g of bis(4-tert-butylcyclohexyl) peroxydicarbonate were added after 8 hours and again after 10 hours. The reaction was discontinued after a time of 24 hours, and the batch was cooled to room temperature. The polyacrylate was then blended with 0.2 wt % of Uvacure® 1500, diluted to a solids content of 30% with acetone, and then coated from solution onto a siliconized release film (50 µm polyester) (coating speed 2.5 m/min, drying tunnel 15 m, temperatures zone 1:40° C., zone 2: 70° C., zone 3: 95° C., zone 4: 105° C.). The coatweight was 50 g/m².

Production of Microballoon Mixtures:

The microballoons are introduced into a container in which a dispersant has been introduced. Stirring takes place in a planetary stirrer from pc-Laborsystem, at a pressure of 5 mbar and with a rotary speed of 600 rpm for 30 minutes.

Process 1: Concentration/Production of PSAs:

The acrylate copolymer (base polymer Ac1) was very largely freed from the solvent by means of a single-screw extruder (concentrating extruder, Berstorff GmbH, Germany). The rotary speed of the screw was 150 rpm, the motor current 15 A, and a throughput of 58.0 kg liquid/h was realized. For concentration, a vacuum was applied at three different domes. The reduced pressures were respectively between 20 mbar and 300 mbar. The exit temperature of the concentrated polymer was about 115° C. The solids content after this concentration step was 99.8%. The composition Ad was shaped to a web by means of a roll calender.

Process 2: Production of Foamed Composition (Pressure Sensitive Adhesive of the Invention):

The concentrated base polymer was melted in a feeder extruder (single-screw conveying extruder from TRO-ESTER GmbH & Co KG, Germany) and was conveyed by this extruder, in the form of a polymer melt, via a heatable hose into a planetary roller extruder from Entex (Bochum) (more particularly a PRE with four modules $T_1$, $T_2$, $T_3$, $T_4$ heatable independently of one another was used). The filler (inorganic bodies K) was then added via two side feeders. The crosslinker was added further downstream, and all of the components were mixed to form a homogeneous polymer melt.

By means of a melt pump and a heatable hose, the polymer melt was transferred into a twin-screw extruder (from Berstorff) and the accelerator component was added. The mixture as a whole was subsequently freed from all gas inclusions in a vacuum dome at a pressure of 175 mbar. Following the vacuum zone, a blister was located on the screw, which allowed a build-up of pressure in the subsequent segment. Through appropriate control of the extruder speed and of the melt pump, a pressure of greater than 8 bar was built up in the segment between blister and melt pump; the microballoon mixture (microballoons embedded into the dispersing assistant) was added at a further metering point, and these components were incorporated homogeneously into the premix by means of a mixing element. The resulting melt mixture was transferred to a die.

Following departure from the die, in other words after a drop in pressure, the incorporated microballoons underwent expansion, and the drop in pressure resulted in a low-shear or, in particular, shear-free cooling of the polymer composition. This produced a foamed self-adhesive composition, which was subsequently shaped in web form by means of a roll calender.

Process 3: Production of 3-Layer Systems Using 2-Roll Calender:

By means of a distributor die, the foamed composition, fully compounded with the crosslinker-accelerator system, the microballoons and the fillers, was conveyed to the roll nip. Between the calender rolls, in the roll nip, the foamed composition was shaped into a viscoelastic film between two self-adhesive compositions Ac-PSA, which were themselves supplied in a form coated onto siliconized release films. At the same time there was shaping of the foamed composition to the set layer thickness, and coating thereof with the two self-adhesive compositions supplied. In order to improve the anchoring of the self-adhesive compositions Ac-PSA on the foamed carrier layer, the self-adhesive compositions underwent corona treatment at a corona station (corona unit from VETAPHONE, Denmark, 50 W·min/m$^2$) before being conveyed into the roll nip. After the production of the 3-layer assembly, this treatment resulted in improved chemical attachment to the foamed carrier layer.

The web speed when traversing the coating installation was 30 m/min.

Following departure from the roll nip, one release film was removed, and the finished 3-layer product was wound up with the second release film.

Formulas of the Foamed Layers

| | | | Components - proportion in wt % | | | | | | |
|---|---|---|---|---|---|---|---|---|---|
| No. | Ac1 | K | Palamoll 652 | MB1 | MB2 | Polypox R16 | Jeffcat Z130 | Resin DT110 | Density, kg/m$^3$ |
| 1 | 53.46 | 1 (40) | 3 | 3 | | 0.35 | 0.19 | | 1041 |
| 2 | 58.46 | 1 (35) | 3 | | 3 | 0.35 | 0.19 | | 885 |
| 3 | 60.46 | 1 (35) | 2 | | 2 | 0.35 | 0.19 | | 949 |
| 4 | 60.40 | 2 (35) | 2 | 2 | | 0.35 | 0.25 | | 880 |
| 5 | 63.40 | 3 (30) | 3 | | 3 | 0.35 | 0.25 | | 1320 |
| 6 | 41.66 | 1 (35) | 3 | | 3 | 0.35 | 0.19 | 16.80 | 853 |
| | | | Non-inventive examples | | | | | | |
| 7 | 99.40 | | | | | 0.35 | 0.25 | | 788 |
| 8 | 67.46 | 1 (8) | 12 | 12 | | 0.35 | 0.19 | | 780 |
| 9 | 76.66 | | 3 | | 3 | 0.35 | 0.19 | 16.80 | 760 |
| 10 | 59.46 | 1 (40) | | | | 0.35 | 0.19 | | 1122 |
| 11 | 63.40 | 4 (30) | 3 | | 3 | 0.35 | 0.25 | | 1320 |

Test Results

Inventive Examples

| | Adhesive tape with foamed layer No. | | | | | |
|---|---|---|---|---|---|---|
| | 1 | 2 | 3 | 4 | 5 | 6 |
| Construction (number of layers) | 3 | 3 | 3 | 3 | 3 | 1 |
| Dynamic shear test after 3 days at room temperature, N/cm$^2$ | 94 | 91 | 87 | 90 | 95 | 164 |
| Fracture mode | c | c | c | c | c | c |
| Dynamic L-test, N/25 mm | 280 | 280 | 230 | 310 | 290 | 420 |

-continued

| | Adhesive tape with foamed layer No. | | | | | |
|---|---|---|---|---|---|---|
| | 1 | 2 | 3 | 4 | 5 | 6 |
| Fracture mode | c | c | c | c | c | c |
| T-block test, N/cm$^2$ | 90 | 77 | 78 | 105 | 101 | 180 |
| Fracture mode | c | c | c | c | c | c |
| Peel adhesion to steel, ASTM, instantaneous, N/cm | 23 | 17 | 18 | 15 | 18 | 28 |
| Fracture mode | c | c | c | c | c | c |
| Peel adhesion to steel, ASTM, after 3 days at room temperature, N/cm | 56 | 45 | 42 | 51 | 52 | 45 |
| Fracture mode | c | c | c | c | c | c |
| Holding power at 70° C., 5 N, min | >10 000 | >10 000 | >10 000 | >10 000 | >10 000 | 520 |
| Holding power after 3 days, room temperature, 10 N, min | >10 000 | >10 000 | >10 000 | >10 000 | >10 000 | >10 000 |

Test Results

Non-Inventive Examples

| | Adhesive tape with foamed layer No. | | | | |
|---|---|---|---|---|---|
| | 7 | 8 | 9 | 10 | 11 |
| Construction (number of layers) | 3 | 3 | 1 | 3 | 3 |
| Dynamic shear test after 3 days at room temperature, N/cm$^2$ | 60 | 105 | 87 | 82 | 78 |
| Fracture mode | c | a | c | a | a |
| Dynamic L-test, N/25 mm | 180 | 290 | 230 | 282 | 220 |
| Fracture mode | c | a | c | c | a |
| T-block test, N/cm$^2$ | 56 | 70 | 78 | 52 | 70 |
| Fracture mode | c | c | c | a | a |
| Peel adhesion to steel, ASTM, instantaneous, N/cm | 12 | 18 | 19 | 8 | 13 |
| Fracture mode | a | a | a | a | a |
| Peel adhesion to steel, ASTM, after 3 days at room temperature, N/cm | 22 | 25 | 41 | 18 | 20 |
| Fracture mode | a | a | a | a | a |
| Holding power at 70° C., 5 N, min | 320 | 120 | 510 | >10 000 | 2000 |
| Holding power after 3 days, room temperature, 10 N, min | 2200 | 3100 | 1600 | >10 000 | >10 000 |

The invention claimed is:

1. A pressure sensitive adhesive comprising
30-90 wt % of at least one poly(meth)acrylate;
10-60 wt % of three-dimensional bodies K made from an inorganic material with a maximum extent of 40 to 300 μm; and
0.1-10 wt % of at least partly expanded microballoons M, based in each case on the total weight of the pressure sensitive adhesive.

2. The pressure sensitive adhesive according to claim 1, wherein the inorganic material of the three-dimensional bodies K is glass, ceramic and/or flyash.

3. The pressure sensitive adhesive according to claim 1, wherein the three-dimensional bodies K are solid glass beads, hollow ceramic beads and/or hollow flyash beads.

4. The pressure sensitive adhesive according to claim 1, wherein the maximum extent of the three-dimensional bodies K is 45 pm to 150 μm.

5. The pressure sensitive adhesive according to claim 1, wherein the pressure sensitive adhesive contains 30-50 wt % of three-dimensional bodies K.

6. The pressure sensitive adhesive according to claim 1, wherein the pressure sensitive adhesive contains 30-50 wt % of three-dimensional bodies K having a maximum extent of 45 to 150 μm.

7. The pressure sensitive adhesive according to claim 1, wherein the weight ratio of three-dimensional bodies K to at least partly expanded microballoons M is from 6:1 to 30:1.

8. An adhesive tape comprising a pressure sensitive adhesive A which pressure sensitive adhesive A is a pressure sensitive adhesive according to claim 1.

9. The adhesive tape according to claim 8, wherein the adhesive tape comprises on at least one side of the pressure sensitive adhesive A a further pressure sensitive adhesive.

10. The pressure sensitive adhesive according to claim 2, wherein the maximum extent of the three-dimensional bodies K is 45 μm to 150 μm.

11. The pressure sensitive adhesive according to claim 3, wherein the maximum extent of the three-dimensional bodies K is 45 μm to 150 μm.

12. The pressure sensitive adhesive according to claim 2, wherein the pressure sensitive adhesive contains 30-50 wt % of three-dimensional bodies K.

13. The pressure sensitive adhesive according to claim 3, wherein the pressure sensitive adhesive contains 30-50 wt % of three-dimensional bodies K.

14. The pressure sensitive adhesive according to claim 2, wherein the pressure sensitive adhesive contains 30-50 wt % of three-dimensional bodies K having a maximum extent of 45 to 150 μm.

15. The pressure sensitive adhesive according to claim 3, wherein the pressure sensitive adhesive contains 30-50 wt % of three-dimensional bodies K having a maximum extent of 45 to 150 μm.

16. The pressure sensitive adhesive according to claim 2, wherein the weight ratio of three-dimensional bodies K to at least partly expanded microballoons M is from 6:1 to 30:1.

17. The pressure sensitive adhesive according to claim 3, wherein the weight ratio of three-dimensional bodies K to at least partly expanded microballoons M is from 6:1 to 30:1.

18. An adhesive tape comprising a pressure sensitive adhesive A, which pressure sensitive adhesive A is a pressure sensitive adhesive according to claim 2.

19. An adhesive tape comprising a pressure sensitive adhesive A, which pressure sensitive adhesive A is a pressure sensitive adhesive according to claim 3.

\* \* \* \* \*